United States Patent [19]

Bi et al.

[11] 4,248,982

[45] Feb. 3, 1981

[54] CLEAR IMPACT RESISTANT THERMOPLASTIC STAR-BLOCK COPOLYMERS

[75] Inventors: Le-Khac Bi, Pittsburgh; Ralph Milkovich, Murrysville, both of Pa.

[73] Assignee: Arco Polymers, Inc., Philadelphia, Pa.

[21] Appl. No.: 34,830

[22] Filed: Apr. 30, 1979

[51] Int. Cl.$^3$ .......................... C08L 9/00; C08L 47/00
[52] U.S. Cl. .................................. 525/271; 525/250; 525/314
[58] Field of Search ..................... 525/250, 271, 314

[56] References Cited

U.S. PATENT DOCUMENTS

| | | | |
|---|---|---|---|
| 4,086,298 | 4/1978 | Fahrbach et al. | 525/250 |
| 4,087,484 | 5/1978 | Miki et al. | 260/880 B |
| 4,089,913 | 5/1978 | Miki et al. | 260/880 B |
| 4,105,714 | 8/1978 | Trepka et al. | 525/271 |

*Primary Examiner*—William F. Hamrock
*Attorney, Agent, or Firm*—Lewis J. Young

[57] ABSTRACT

The preparation of a branched, radial block copolymer having improved falling weight impact properties, and having trimodal distribution of molecular structure in the arms of the block copolymer is described.

6 Claims, No Drawings

CLEAR IMPACT RESISTANT THERMOPLASTIC STAR-BLOCK COPOLYMERS

BACKGROUND OF THE INVENTION

The present invention relates to resinous star-block copolymers having improved impact properties and good clarity.

Highly branched block copolymers, sometimes called star-block copolymers, are old in the art of anionic polymerization. These star-block copolymers are prepared by first forming linear block polymers having active lithium atom on one end of the polymer chain. These active, linear polymer chains are then coupled by the addition of a polyfunctional compound having at least three reactive sites capable of reacting with the carbon to lithium bond on the polymer chains to add the polymer chain onto the functional groups of the compound.

Zelinski, U.S. Pat. No. 3,280,084, polymerized butadiene with butyllithium initiator to form B-Li blocks (where B is polybutadiene) which when coupled with divinylbenzene gave highly branched copolymers having polydivinylbenzene nuclei and several identical arms of polybutadiene branching therefrom. The arms can also be either random or block copolymers of styrene and butadiene (from A-B-Li blocks, where A is polystyrene segment) where the diene is the major component.

Childers, U.S. Pat. No. 3,637,554, prepares rubbery star-block copolymers having nuclei formed from polyepoxides, polyisocyanates, polyimines, etc., and identical arms from B-Li and A-B-Li.

Kitchen et al, U.S. Pat. No. 3,639,517, teaches that star-block copolymer may be formed having different molecular weight arms attached to the same nucleus. These arms are formed by using multiple additions of styrene monomer and initiator to form A-Li; A'-Li; and A"-Li, where A, A' and A" are polystyrene blocks of different molecular weights, then by a single addition of butadiene, and finally coupling these arms to form star-block copolymers having bi-,tri-, and polymodal molecular weight distribution in the arms.

Fetters et al, U.S. Pat. No. 3,985,830, discloses a product having at least two star-block copolymers linked together by a linking agent, such as phosgene, silicon tetrachloride or dihalosilanes.

Fodor, U.S. Pat. No. 4,051,197, discloses blends of two star-block copolymers, each having molecular weight distribution in its arms outside a given range, to form a blend having a distribution within the given range.

Fahrback et al, U.S. Pat. No. 4,086,298, discloses star-block copolymers having a mixture of arms wherein some are formed by first polymerizing styrene with alkyllithium to form A-Li blocks, and then adding a mixture of styrene and butadiene to form a graded copolymer represented by A-B→A', where the arrow represents a graded segment. Other arms are made up on only the butadiene-styrene graded copolymer segment.

Kitchen, U.S. Pat. No. 4,091,053, teaches that star-block copolymers having long integral hinge flex life and high hardness can be made by the method of U.S. Pat. No. 3,639,517 wherein the ratio of molecular weight of the styrene blocks in a longer (A') block to that of a shorter (A) block is maintained within the range of 3 to 7.

Vreugdenhil, U.S. Pat. No. 4,092,375, makes the bimodal star-block copolymers of Kitchen, U.S. Pat. No. 3,639,517 by separately preparing blocks of A-B-Li and B-Li, and then coupling mixtures thereof.

SUMMARY OF THE INVENTION

We have now found that transparent impact resistant thermoplastic star-block copolymers can be made which have good impact resistance at room temperature.

The copolymers contain 60 to 90 percent by weight of a monovinyl aromatic compound and 40 to 10 percent by weight of a conjugated diene having 4 to 8 carbon atoms. The copolymers have the general formula

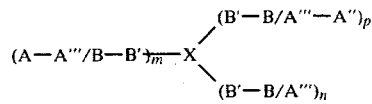

where A and A" are non-elastomeric polymer segments whose sum is based on 80 to 95 percent by weight of the total monovinyl aromatic compound, A'''/B or B/A''' is an elastomeric copolymer segment based on a random copolymer of the monovinyl aromatic compound and the conjugated diene wherein the weight ratio of A''' to B must be less than 1.0, B' is an elastomeric segment of poly (conjugated diene) containing 20–40 percent by weight of the total conjugated diene, m, n and p are integers whose sum is between 3 and 20, and X is the radical of a polyfunctional coupling agent forming the nucleus of the star-block copolymer.

DETAILED DESCRIPTION OF THE INVENTION

The thermoplastic, star-block copolymers of this invention are prepared by a five-stage process of anionic polymerization.

In the first stage, 50 to 70 percent by weight of the total amount of monovinyl aromatic compound is polymerized in an inert solvent using a hydrocarbyllithium initiator to form linear segments (A'-Li), of the monovinyl aromatic compound having lithium ions at the ends. The polymerization is allowed to proceed to essential completion.

In the second stage, an additional amount of the hydrocarbyllithium initiator, equal to or greater than the amount added in the first stage, is added to the mixture from stage one. An additional 10 to 45 percent by weight of the total amount of monovinylaromatic compound, such that the sum of the compound added in stages one and two amounts to between 80 and 95 percent by weight of the total amount of compound in the final block copolymer, is added and polymerized to essential completion, whereby a mixture of linear segments (A-Li) and (A"-Li) is formed. The A-Li segments are formed by the continued growth of the A'-Li segments formed in stage one. Hence the A block will be equal in size to the sum of the A' block formed in stage one plus the A" block formed in stage two.

In the third stage, an additional amount of the hydrocarbyllithium initiator, equal to or greater than the amount added in the second stage, is added to the mixture from stage two, the remainder of the monovinyl aromatic compound is added, and 60 to 80 percent by weight of the total amount of the conjugated diene is continuously added at a rate, determined by the amounts of total monomer and the relative copolymerization rates of the monovinyl aromatic compound and the conjugated diene, such that an essentially random copolymer segment, B/A'''-Li, is formed. Simultaneously with the formation of the B/A'''-Li segments, the A-Li and A''-Li segments from stage two will form A-B/A'''-Li and A''-B/A'''-Li segments, respectively.

The third stage may also be carried out by other known means of preparing styrene/butadiene type random copolymers. For example, after the additional amount of initiator is added to the mixture from stage two, a mixture of the remaining monovinyl aromatic compound and 60 to 80 percent by weight of the total amount of conjugated diene can be added continuously to the reaction mixture at a rate such that an essentially random copolymer block is formed. Methods are also known for producing random copolymer blocks using as randomizer a polar compound, such as the tertiary amines, thioethers, or cyclic ethers.

In the fourth stage, the remaining 20-40 percent by weight of conjugated diene is added to the segments from stage three and allowed to polymerize to essentially complete conversion to form a polydiene block segment on each of the previously formed segments. Thus, the mixture now contains A-B/A'''-B'-Li, A''-B/A'''-B'-Li, and B/A'''-B'-Li segments.

In the fifth stage, a polyfunctional coupling agent is added to the solution of A-B/A'''-B'-Li, A''-B/A'''-B'-Li, and B/A'''-B'-Li segments and allowed to couple the segments into the radial block copolymer of general formula

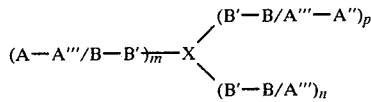

where m, n and p are integers whose sum is between 3 and 20, A and A'' are the nonelastomeric polymer segments whose sum is based on 80 to 95 percent by weight of the total monovinyl aromatic compound, B/A''' is an elastomeric copolymer segment based on a random copolymer of the monovinyl aromatic compound and the conjugated diene wherein the weight ratio of A''' to B must be less than 1.0, B' is an elastomeric segment based on 20-40 percent by weight of the total conjugated diene, and X is the radical of the polyfunctional coupling agent.

Preferred products will have elastomeric segments, B/A''', whose weight ratio of A''', to B is between 0.25 and 0.67, more preferably between 0.33 and 0.54.

Similarly, preferred products will have a weight ratio of non-elastomer segments, A plus A'', to elastomeric segments, B/A''', of greater than 1.0, such as between 1.2 and 6.0, more preferably between 1.5 and 3.0.

The monovinyl aromatic compound useful in the invention is preferably styrene, but may be alkyl substituted styrenes which have similar copolymerization characteristics, such as the ring substituted methylstyrenes, ethylstyrenes, and t-butylstyrene.

The amount of monovinyl aromatic compound useful in the invention is between 60 and 90 percent by weight based on the total weight of monomers utilized.

The hydrocarbyllithium initiators useful in the invention are the known alkyllithium compounds, such as methyllithium, n-butyllithium, sec-butyllithium; the cyclo-alkyllithium compounds, such as cyclohexyllithium; and the aryllithium compounds, such as phenyllithium, p-tolyllithium, and naphthyllithium.

The amounts of hydrocarbyllithium added should be between 0.2 and 10.0 millimoles per mole of monomer in each stage of the instant process. Each stage should use the same or a greater amount of initiator than the previous stage. The total amount of initiator used depends on the molecular weight and number of polymer chains of each type desired.

The conjugated dienes useful in the invention are those having from 4 to 8 carbon atoms in the molecule, such as 1,3-butadiene, isoprene, 2,3-dimethyl-1,3-butadiene, piperylene and mixtures thereof.

The polymerization is conducted in an inert hydrocarbon solvent such as isobutane, pentane, cyclo-hexane, benzene, toluene, xylene and the like. The polymerization is carried out in the absence of air, moisture, or any other impurity which is known to be detrimental to anionic catalyst systems. The temperature of polymerization may be conventionally from 0° to 120° C., and preferably between 40° and 80° C.

The polyfunctional coupling agents suitable for the invention may be any of the materials known to have functional groups which can react with carbon to lithium bonds to add the carbon chain to the functional group. Typical examples of the suitable coupling agents are the polyepoxides, such as epoxidized linseed oil; the polyesters such as diethyl adipate; the polyhalides, such as silicon tetrahalide; the polyisocyanates, such as benzene-1,2,4-triisocyanate; the polyimines, such as tri(1-aziridinyl) phosphine oxide; the polyaldehydes, such as 1,4,7-naphthalene tricarboxaldehyde; the polyketones, such as 2,4,6-heptanetrione; the polyanhydrides, such as pyromellitic dianhydride; and the polyacid chlorides, such as mellitic acid chloride. Especially useful, and preferred herein, are the polyvinyl aromatic compounds such as divinylbenzene, which although only difunctional as monomers, can polymerize to form polyfunctional agents in situ and serve as coupling agents. Suitable are the ortho-, meta-, or para-divinylbenzenes, or mixtures thereof.

The amount and type of coupling agent used is dependent upon the number of polymer chains having lithium terminated ends and the number of arms desired per star-block molecule. Thus, for agents having a fixed number of functional groups such as silicon tetrachloride, an equivalent of agent per equivalent of lithium terminated polymer chains, gives a four armed star-block copolymer. In the case of difunctional agents which polymerize during the coupling reaction, such as divinylbenzene, the amounts of agent to be used must be determined for the conditions of reaction, since the number of equivalent functional sites is variable.

The following example is given to illustrate the invention, but not to limit the claims. All parts and percentages are by weight unless otherwise specified.

EXAMPLE I

A one gallon stirred reactor was charged with 2,000 g. of purified cyclohexane and heated to 70° C. A trace of diphenylethylene (0.2 g.) was added to the cyclohexane by means of a hypodermic needle. A solution of sec-butyllithium in cyclohexane was added to the reactor portionwise until a permanent orange-yellow color was obtained. The solution was then backtitrated with cyclohexane until the color just disappeared. The solvent and reactor were now ready for the polymerization of monomer. Into the closed reactor was charge 5.0 m. moles of n-butyllithium and 365 g. of styrene and the reactor held at 70° C. for 20 minutes. Analysis of the solution by U.V. analysis showed that less than 0.01% by weight of the styrene monomer remained. Then, an additional 6 m. moles of n-butyllithium and 220 g. of styrene were added and the reactor held at 70° C. for 20 minutes. Again, all the styrene monomer had polymerized. At this point, an additional 11.0 m. moles of n-butyllithium was added and a continuous feed of 144 g. of butadiene was added over 90 minutes using a controlled volume mini-pump. About 2 minutes after the start of the butadiene feed, a charge of 115 g. of styrene was added. When the last of the continuous feed was added, an additional 63 g. of butadiene was added and the whole mixture held for 30 minutes. There was then added 11.0 g. of divinylbenzene of 53% purity and the whole held for 1-2 hours at 70° C. to complete the linking reaction. The system was then terminated by the addition of 1 g. of methanol. The polymer solution was transferred to a 5 gallon polyethylene liner, diluted further with acetone and the polymer was precipitated by adding isopropanol under high speed stirring. The polymer was then treated with 1.0 part Polygard HR, a commercial antioxidant, and 0.5 part 2,6-ditertbutyl-4-methylphenol per 100 parts by weight of polymer. The wet polymer was dried by a hot air stream in a fluid bed dryer, then extruded and pelletized.

The product was analyzed and found to have about 10 linear arms which had a trimodal distribution in molecular weight prior to coupling. The longest arms had a number average molecular weight of about 110,000 consisting of a polystyrene block of number average molecular weight 93,000 a block of random styrene/butadiene copolymer of number average molecular weight 13,000 and a polybutadiene block of number average molecular weight 4,000. The intermediate arms had a number average molecular weight of about 37,000 consisting of a polystyrene block of number average molecular weight of 20,000, a block of random styrene/butadiene copolymer of number average molecular weight 13,000, and a polybutadiene block of number average molecular weight 4,000. The shorter arms had a number average molecular weight of 17,000 and consisted only of a random styrene/butadiene copolymer segment and a polybutadiene segment identical to those in the longer arms. The arms, before coupling, were present in the mixture in the mole ratio of 20/30/50 (longest/intermediate/shorter). Number average molecular weights were determined by Gel Permeation chromatograph using polystyrene standards. The random nature of the rubbery styrene/butadiene segments was shown by plotting Tanδ vs. Temperature (from torsion pendulum measurements) and noting the single glass transition temperature at −50° C. Injection molded tensile bars of the star-block copolymer were very transparent and the physical properties are shown in Table I. The melt index was determined by ASTM D-1238 to 200° C. under 5,000 g. load. The Gardner falling weight impact test was performed on a Gardner Variable Impact Tester manufactured by Gardner Laboratory, Inc., of Bethesda, Maryland. Izod unnotched impact was measured by ASTM D-256 and the Flex modulus by ASTM D-790. The overall composition of the radial block copolymer was 77.2% by weight styrene and 22.8% by weight butadiene, with 83.6% of the total styrene being in the polystyrene block segment of the long arms and 16.4% of the total styrene being in the styrene/butadiene random segment. This material was free of orientation during the processing and non-stress whitening on bending.

TABLE I

|  | Ex. I | Comp. A |
| --- | --- | --- |
| Melt Index (g./10 min) | 2.0 | 1.2 |
| Gardner Falling Weight (in.-lb.) | | |
| at Room Temperature | 320 | 20 |
| at −20° C. | 100 | 6 |
| Izod Impact, Unnotched (ft.-lb./in.) | 18.5 | 3.8 |
| Flex Modulus (psi) | 197,000 | 229,000 |

COMPARATIVE EXAMPLE A

A one gallon stirred reactor was charged with 2,000 g. of purified cyclohexane, heated to 70° C., and titrated with sec-butyllithium, as in Example I, to sterilize solvent and reactor. Into the closed reactor was charged 4.93 millimoles of n-butyllithium and 473 g. of styrene and the reactor held at 70° C. for 20 minutes to ensure complete polymerization of all the styrene to polystyryl chains terminated by active lithium ions. Then, an additional 18.53 m. moles of n-butyllithium and 203 g. of styrene were added and allowed to polymerize for 25 minutes. The mixture consisted of two different number average molecular weight chains of polystyryl lithium with essentially no residual styrene monomer. To this mixture was added 225 g. of butadiene and the polymerization allowed to proceed for 45 minutes to form identical polybutadiene blocks at the ends of both polystyrene blocks. To the resulting bimodal mixture of linear block copolymers was added 10.5 g. of 55% divinylbenzene and the whole held for 1-2 hours at 70° C. to complete the linking reaction. The highly branched copolymers having about 10 arms, having bimodal distribution were separated as in Example I and the physical properties measured. The results are also shown in Table I. Torsion pendulum measurements showed a Tg of −75° C., indicating that the butadiene was in the form of pure polybutadiene blocks, rather than the random styrene/butadiene blocks of Example I.

The unexpected superiority of the impact strength of the star-block copolymer of Example I over the known copolymer of the Comparative Example A is obvious from the Table I.

EXAMPLE II

The procedure of Example I is repeated up to the point where the second addition of styrene has polymerized. At this point, and additional 11.0 m. moles of n-butyllithium is added and a continuous feed of a mixture of 115 g. of styrene and 144 g. of butadiene is added over 90 minutes using a controlled volume mini-pump. When the last of the continuous feed is added, an additional 63 g. of butadiene is added and the whole mixture is held for 30 minutes. The coupling agent is then added and the product worked up as in Example I. Analysis of the product will show that the product has the same structure and properties as the product from Example I.

We claim:

1. Star-block copolymers, of from 60 to 90% by weight of a monovinyl aromatic compound and 40 to 10% by weight of a conjugated diene of 4 to 8 carbon atoms, which have an average structure of the general formula,

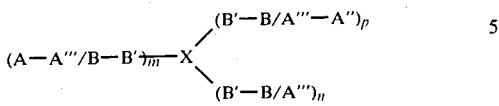

where A and A″ are non-elastomeric polymer segments based on the monovinyl aromatic compound, B/A‴ or A‴/B is an elastomeric polymer segment based on a random copolymer of the monovinyl aromatic compound and the conjugated diene wherein the weight ratio of A‴ (the weight percent of monovinyl aromatic compound in the elastomeric polymer segment) to B (the weight percent of conjugated diene in the elastomeric polymer segment) must be less than 1.0, B′ is an elastomeric polymer segment based on the conjugated diene, m, n and p are integers whose sum is between 3 and 20, and X is the radical of a polyfunctional coupling agent by means of which the linear polymer blocks (A-B/A‴-B′), (A″-B/A‴-B′) and (B/A‴-B′) are chemically bonded to form the star-block copolymers, wherein said segment A″ contains 10 to 45% by weight of the total monovinyl aromatic compound and the sum of segments A and A″ amounts to 80 to 95% by weight of the total monovinyl aromatic compound, segment B′ contains 20 to 40% by weight of the total conjugated diene, and segment B/A‴ contains no significant blocks of either monovinyl aromatic compound or conjugated diene.

2. The star-block copolymer of claim 1 wherein said polyfunctional coupling agent is selected from o-divinylbenzene, m-divinylbenzene, p-divinylbenzene, and mixtures thereof.

3. The star-block copolymer of claim 1 wherein said polyfunctional coupling agent is selected from polyepoxides, polyesters, polyhalides, polyisocyanates, polyimines, polyaldehydes, polyketones, polyanhydrides, and polyacidchlorides.

4. The star-block copolymer of claim 1 wherein the monovinyl aromatic compound is styrene, the conjugated diene is butadiene, and the polyfunctional coupling agent is divinylbenzene.

5. A highly branched, resinous star-block copolymer having 60 to 90% by weight of a monovinyl aromatic compound and 40 to 10% by weight of a conjugated diene when prepared by a process consisting of (a) polymerizing in a first stage of the process, from 50 to 70% by weight of the total amount of monovinylaromatic compound in an inert solvent, in the presence of a relatively small amount of a hydrocarbyllithium initiator until conversion is virtually complete, (b) in a second stage of process, adding to the reaction solution a further amount of hydrocarbyllithium initiator, equal to or greater than the amount added in step (a), followed by the addition to the mixture of an additional 10 to 45% by weight of the total amount of monovinylaromatic compound, such that the sum of the compound added in steps (a) and (b) amounts to between 80 and 95% by weight of the total amount of compound in the final block copolymer, and again polymerizing until conversion is virtually complete, (c) in a third stage of the process, adding to the reaction solution a further amount of hydrocarbyllithium initiator, equal to or greater than the amount added in step (b), followed by the addition to the mixture of the remaining monovinylaromatic compound and continuously adding from 60 to 80% by weight of the total amount of the conjugated diene at a rate such that the monovinylaromatic compound and conjugated diene copolymerize in an essentially random fashion until conversion is again essentially complete, (d) in the fourth stage of the process, adding the remaining 20 to 40% by weight of conjugated diene to the reaction solution and polymerizing to essentially complete conversion, and (e) thereafter subjecting the resulting mixture of linear block and random copolymers with active terminal lithium to carbon bonds to a coupling reaction, by adding a polyfunctional coupling agent, to form a branched block copolymer and finally isolating the branched block copolymer.

6. A highly branched, resinous star-block copolymer having 60 to 90% by weight of a monovinyl aromatic compound and 40 to 10% by weight of a conjugated diene when prepared by a process consisting of (a) polymerizing in a first stage of the process, from 50 to 70% by weight of the total amount of monovinylaromatic compound in an inert solvent, in the presence of a relatively small amount of a hydrocarbyllithium initiator until conversion is virtually complete, (b) in a second stage of process, adding to the reaction solution a further amount of hydrocarbyllithium initiator, equal to or greater than the amount added in step (a), followed by the addition to the mixture of an additional 10 to 45% by weight of the total amount of monovinylaromatic compound, such that the sum of the compound added in steps (a) and (b) amounts to between 80 and 95% by weight of the total amount of compound in the final block copolymer, and again polymerizing until conversion is virtually complete, (c) in a third stage of the process, adding to the reaction solution a further amount of hydrocarbyllithium initiator, equal to or greater than the amount added in step (b), followed by the continuous addition of a mixture of the remaining monovinyl aromatic compound and 60 to 80% by weight of the total amount of the conjugated diene at such a rate that the monovinyl aromatic compound and the conjugated diene copolymerize in an essentially random fashion, (d) in the fourth stage of the process, adding the remaining 20 to 40% by weight of conjugated diene to the reaction solution and polymerizing to essentially complete conversion, and (e) thereafter subjecting the resulting mixture of linear block and random copolymers with active terminal lithium to carbon bonds to a coupling reaction, by adding a polyfunctional coupling agent, to form a branched block copolymer and finally isolating the branched block copolymer.

* * * * *